US008832333B2

(12) United States Patent
Morita

(10) Patent No.: US 8,832,333 B2
(45) Date of Patent: Sep. 9, 2014

(54) MEMORY SYSTEM AND DATA TRANSFER METHOD

(75) Inventor: Hirokazu Morita, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 13/237,396

(22) Filed: Sep. 20, 2011

(65) Prior Publication Data

US 2012/0159016 A1    Jun. 21, 2012

(30) Foreign Application Priority Data

Dec. 15, 2010    (JP) ................................. 2010-279357

(51) Int. Cl.
*G06F 13/00*        (2006.01)
*G06F 13/16*        (2006.01)
*G06F 3/06*         (2006.01)

(52) U.S. Cl.
CPC .......... *G06F 13/1673* (2013.01); *G06F 3/0659* (2013.01)
USPC .............................. 710/33; 711/120; 711/150

(58) Field of Classification Search
CPC ................................................ G06F 2212/214
USPC ......... 710/21, 39, 120, 150, 168, 33; 711/150
See application file for complete search history.

(56) References Cited

U.S. PATENT DOCUMENTS

| 8,396,995 | B2 * | 3/2013 | Asnaashari et al. ............... 710/6 |
| 2009/0265513 | A1 * | 10/2009 | Ryu .............................. 711/149 |
| 2009/0292839 | A1 * | 11/2009 | Oh ................................. 710/55 |
| 2009/0313423 | A1 * | 12/2009 | Byeon ........................... 711/103 |
| 2010/0064095 | A1 * | 3/2010 | Chen et al. ..................... 711/103 |
| 2010/0125695 | A1 * | 5/2010 | Wu et al. ........................ 711/103 |
| 2010/0161885 | A1 | 6/2010 | Kanno et al. |
| 2010/0169549 | A1 | 7/2010 | Yano et al. |
| 2010/0169551 | A1 | 7/2010 | Yano et al. |
| 2010/0169553 | A1 | 7/2010 | Yano et al. |

(Continued)

FOREIGN PATENT DOCUMENTS

| JP | 6-95962 | 4/1994 |
| JP | 8-221312 | 8/1996 |

(Continued)

OTHER PUBLICATIONS

U.S. Appl. No. 13/063,210, filed May 25, 2011, Hirokuni Yano, et al.
Japanese Office Action issued Oct. 22, 2013, in Japan Patent Application No. 2010-279357 (with English translation).

*Primary Examiner* — Ernest Unelus
(74) *Attorney, Agent, or Firm* — Oblon, Spivak, McClelland, Maier & Neustadt, L.L.P.

(57) ABSTRACT

According to the embodiment, a memory system includes a first memory which includes a memory cell array and a read buffer, a second memory, a command queue, a command sorting unit, and a data transfer unit. The command sorting unit dequeues commands excluding a later-arrived command whose access range overlaps with an access range of an earlier-arrived command from the command queue. The data transfer unit performs a data preparing process of transferring data that is specified by dequeued read command and is read out from the memory cell array to the read buffer, a first data transfer of outputting the data stored in the read buffer, and a second data transfer of storing data that is specified by dequeued write command in the second memory. The data transfer unit is capable of performing the data preparing process and the second data transfer in parallel.

20 Claims, 11 Drawing Sheets

(56) References Cited

U.S. PATENT DOCUMENTS

2011/0128063 A1* 6/2011 Fukuda et al. ............... 327/333
2011/0231610 A1 9/2011 Yano et al.
2012/0144090 A1* 6/2012 Song et al. .................. 711/102

FOREIGN PATENT DOCUMENTS

| JP | 2006-139548 | 6/2006 |
| JP | 2006-155335 | 6/2006 |
| JP | 2009-211231 | 9/2009 |

* cited by examiner

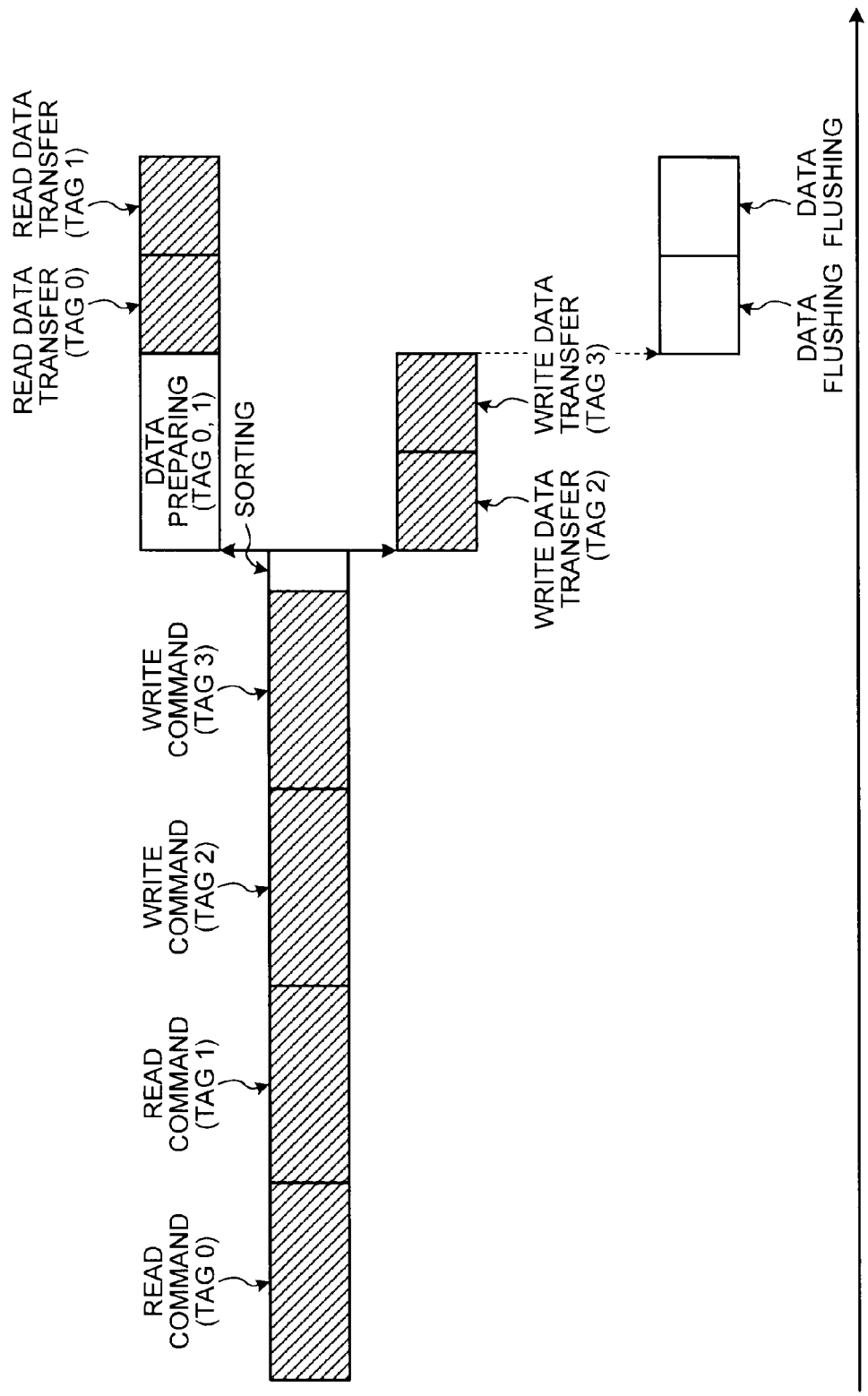

MEMORY SYSTEM AND DATA TRANSFER METHOD

CROSS-REFERENCE TO RELATED APPLICATIONS

This application is based upon and claims the benefit of priority from Japanese Patent Application No. 2010-279357, filed on Dec. 15, 2010; the entire contents of which are incorporated herein by reference.

FIELD

The present embodiments typically relate to a memory system and a data transfer method.

BACKGROUND

As a memory system used in a computer system (hereinafter, computer), an SSD (Solid State Drive) on which a nonvolatile semiconductor memory such as a NAND-type flash memory (hereinafter, simply, NAND memory) is mounted attracts attention. The memory system such as the SSD has advantages such as high speed, lightweight, and low power consumption compared with a magnetic disk device.

BRIEF DESCRIPTION OF THE DRAWINGS

FIG. 12 is a timing chart explaining an example of data transfer between the SSD and the host in the second embodiment of the present invention.

DETAILED DESCRIPTION

According to embodiments, a memory system includes a first memory, a second memory, a command queue, a read queue, a write queue, a command sorting unit, and a data transfer unit. The first memory includes a nonvolatile memory cell array and a read buffer, the read buffer storing data read out from the memory cell array before outputting the data from the first memory. The second memory stores data transmitted from a host apparatus. The command queue stores a write command and a read command received from the host apparatus in order of arrival. The read queue accumulates the read command. The write queue accumulates the write command. The command sorting unit dequeues commands excluding a later-arrived command whose access range overlaps with an access range of an earlier-arrived command from the command queue, and enqueues dequeued command in the read queue or the write queue. The data transfer unit performs a data preparing process of transferring data that is specified by dequeued read command and is read out from the memory cell array to the read buffer, and performs a first data transfer of outputting the data stored in the read buffer to the host apparatus. The data transfer unit performs a second data transfer of storing data that is specified by dequeued write command and is transmitted from the host apparatus in the second memory. the data transfer unit is capable of performing the data preparing process and the second data transfer in parallel.

As one of connection standards of a data storage apparatus such as an HDD (Hard Disk Drive), there is a serial ATA (Serial Advanced Technology Attachment: SATA) standard. According to the SATA standard, a function called an NCQ (Native Command Queuing) is defined, in which read/write commands to an HDD are stored in a queue and the read/write commands stored in the queue are reordered in an efficient order and are executed (reordered execution).

Figure 1:
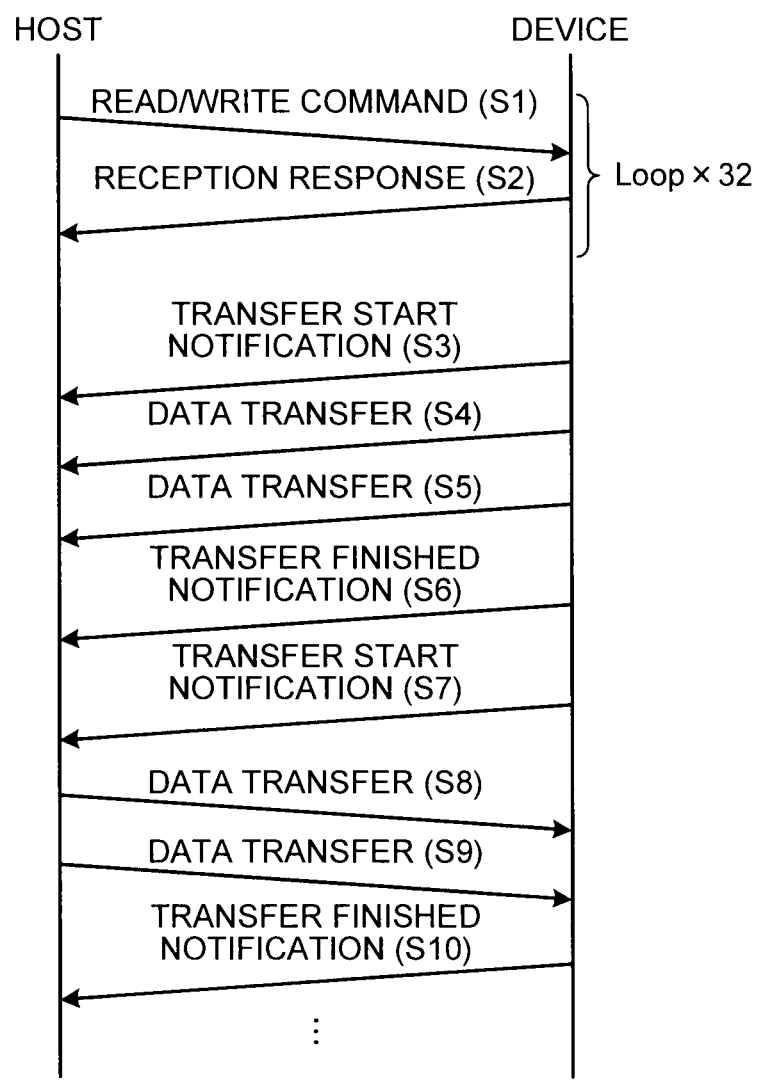
FIG. 1 is a diagram explaining an example of a process procedure of data transfer between a host and a device in which an NCQ function is used.

FIG. 1 is a diagram explaining an example of a process procedure of data transfer between a host and a device in which the NCQ function is used. As shown in FIG. 1, first, the host transmits a write command or a read command to the device (Step S1). Then, the device enqueues the received read/write command in a command queue and transmits a reception response notifying of reception of the command to the host (Step S2).

The operations at Step S1 and Step S2 can be performed repeatedly up to 32 times. Put another way, the device can hold 32 read/write commands in the command queue inside thereof. The read/write command, more specifically, includes a start LBA and the number of sectors for indicating an access range, tag numbers as identifiers for distinguishing 32 queues held in the command queue from each other, and a command cord indicating whether the read/write command is a write command or a read command.

After receiving a plurality of read/write commands, the device reorders the commands stored in the command queue in an order with which the commands can be executed efficiently. Then, when executing one of the reordered commands, the device transmits a transfer start notification, to which the tag number of the execution-target command is attached, to the host (Step S3). When the execution-target command is a read command, the device transfers read data every predetermined unit size defined in the SATA standard following the transfer start notification (Step S4 and Step S5). When data transfer for one read command is finished, the device transmits a transfer finished notification, to which the tag number of the finished read command is attached, to the host (Step S6).

Next, the device moves to the next command execution. Specifically, the device transmits the transfer start notification, to which the tag number of the next command is attached, to the host (Step S7). When the next command is a write command, the host transfers write data to the device every predetermined unit size defined in the SATA standard (Step S8 and Step S9). Then, when the device receives write data of the size specified by the write command, the device transmits the transfer finished notification, to which the tag number of the write command is attached, to the host (Step S10). Thereafter, the device sequentially executes commands held in the command queue in the order in which the commands are reordered.

In this manner, with the use of the NCQ function, the HDD can execute read/write commands in a reordered state to suppress a rotation and a head operation of a magnetic disk to a minimum, so that the transfer efficiency with respect to the host can be improved.

Next, a technology (hereinafter, simply comparison example) to be compared with the embodiments of the present invention is explained. According to the comparison example, the SSD sequentially processes received commands in order of arrival even if the command is issued from the host using the above NCQ function. This is because, when LBAs (Logical Block Addressing) of queued commands overlap, it is needed to follow the chronological order of a write command and a read command in the SATA standard. For example, when a write command and a read command, whose access ranges overlap with each other, are issued from the host in the order of the write command and the read command, it is needed to ensure that the read command is executed after executing the write command.

In the SSD in the comparison example, for performing a sequential process, when a write command is queued after a read command, data transfer related to the write command is kept waiting until data by the read command is prepared in a page buffer. While the data transfer related to the write command is kept waiting, data transfer between the host and the SSD is not performed and, as a result, the data transfer utilization of the SATA interface decreases. Recently, in a NAND memory, the time until the NAND memory prepares data from a cell array to a page buffer after receiving a data preparing command has become nonnegligible in view of the data transfer time of the SATA interface, which impedes improvement of the transfer efficiency between the host and the SSD.

Thus, according to the embodiments of the present invention, read/write commands transferred utilizing the NCQ function are reordered in view of the execution order of read/write commands whose access ranges overlap with each other and data transfer related to a write command is performed during execution of a data preparing process to thereby hide the waiting time required for the data preparing process from the host.

The memory system and the data transfer method according to the embodiments are explained in detail below with reference to accompanying drawings. The present invention is not limited to these embodiments.

Figure 2:
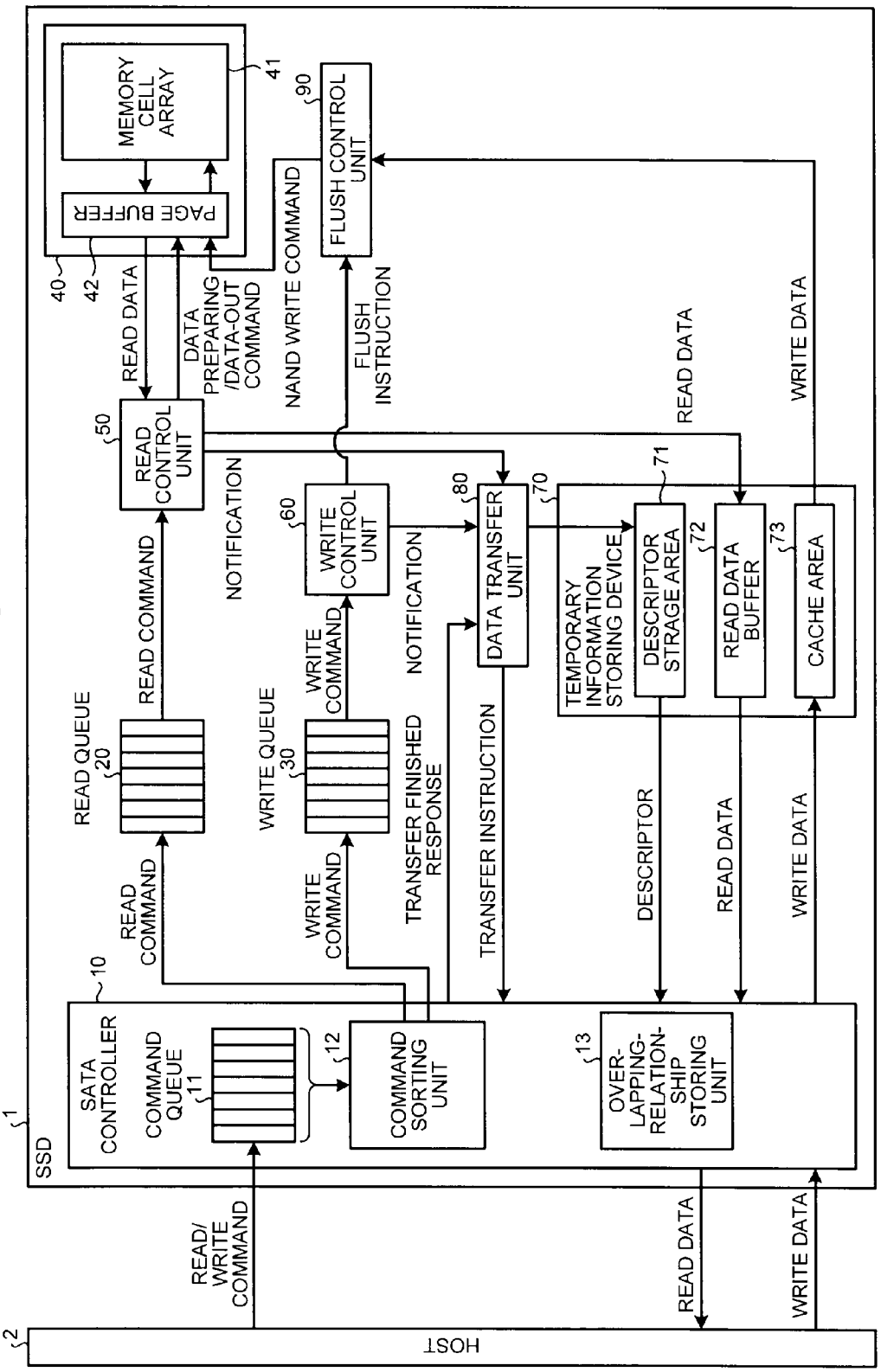
FIG. 2 is a diagram explaining a configuration of an SSD to which a memory system in a first embodiment of the present invention is applied.

FIG. 2 is a diagram explaining a configuration of an SSD to which the memory system in the first embodiment of the present invention is applied. An SSD 1 is connected to a host 2 with a SATA interface and performs reception of a read/write command and write data from the host 2 and transmission of read data to the host 2 via the SATA interface.

The SSD 1 includes a SATA controller 10, a read queue 20, a write queue 30, a NAND memory 40, a read control unit 50, a write control unit 60, a temporary information storing device 70, a data transfer unit 80, and a flush control unit 90.

The NAND memory 40 includes a NAND-type memory cell array 41 that stores therein write data from the host 2 and a page buffer 42 in which data of a readout unit size (page size) from the memory cell array 41 is stored. When the NAND memory 40 receives the data preparing command (for example, 00h-address-30h), the NAND memory 40 reads out data of the page size from the memory cell array 41 and temporarily stores (prepares) the read out data into the page buffer 42. During the data preparing process, the NAND memory 40 outputs a busy signal, and when the data preparing process is finished, the NAND memory 40 outputs a ready signal. When the NAND memory 40 receives a data-out command (for example, a /RE clock is toggled) in the state of outputting the ready signal, the data stored in the page buffer 42 is output.

The SATA controller 10 includes a command queue 11, a command sorting unit 12, and an overlapping-relationship storing unit 13. The overlapping-relationship storing unit 13 is formed of a DRAM (Dynamic Random Access Memory), an SRAM (Static Random Access Memory), or the like. The command queue 11 accumulates therein read/write commands transmitted by using the NCQ function in order of arrival. The command sorting unit 12 checks the access range of each command accumulated in the command queue 11. When there is a later-arrived command whose access range overlaps with an access range of an earlier-arrived command in the commands stored in the command queue 11, the command sorting unit 12 dequeues commands excluding the later-arrived command from the command queue 11, and enqueues a read command in the read queue 20 and enqueues a write command in the write queue 30 among the dequeued commands. The command sorting unit 12 causes the overlapping-relationship storing unit 13 to store therein the relationship between the earlier command and the later command whose access ranges overlap with each other. Specifically, the command sorting unit 12 stores the tag number of the later command and the tag number of the earlier command in association with each other.

For example, in the case where the tag numbers are attached to commands from a command arrived first in ascending order, when access ranges of a command of the tag number "3" and a command of the tag number "4" overlap and access ranges of a command of the tag number "6" and a command of the tag number "7" overlap, the command sorting unit 12 causes the overlapping-relationship storing unit 13 to store therein "3-4, 6-7". Moreover, when access ranges of a command of the tag number "3", a command of the tag number "4", and a command of the tag number "5" overlap, the command sorting unit 12 causes the overlapping-relationship storing unit 13 to store therein "3-4, 3-5, 4-5". Furthermore, when access ranges of a command of the tag number "3" and a command of the tag number "4" overlap, access ranges of the command of the tag number "4" and a command of the tag number "5" overlap, and the access ranges of the command of the tag number "3" and the command of the tag number "5" do not overlap, the command sorting unit 12 causes the overlapping-relationship storing unit 13 to store therein "3-4, 4-5". Moreover, when access ranges of a command of the tag number "3" and a command of the tag number "4" overlap, access ranges of the command of the tag number "3" and a command of the tag number "5" overlap, and the access ranges of the command of the tag number "4" and the command of the tag number "5" do not overlap, the command sorting unit 12 causes the overlapping-relationship storing unit 13 to store therein "3-4, 3-5".

The temporary information storing device 70 is formed of a DRAM, an SRAM, or the like, and includes a descriptor storage area 71, a read data buffer 72, and a cache area 73. The read data buffer 72 is a buffer for transferring data prepared in the page buffer 42 to the host 2. The cache area 73 is a cache for temporarily storing write data transferred from the host 2, and is, for example, managed by general n-way set-associative method and FIFO method. The descriptor storage area 71 stores therein a descriptor in which a specific instruction content for data transfer to be issued to the SATA controller 10 is described. The descriptor for transferring write data, for example, includes a description specifying a physical address of a storage location of write data in the cache area 73 and a size of data to be stored in the storage location, and the descriptor for transferring read data, for example, includes a description specifying a physical address in the read data buffer 72 and a size of data stored in the read data buffer 72.

The read control unit 50 dequeues a read command queued in the read queue 20 and converts the access range described by the LBA and the number of sectors in the dequeued read command into a range of a physical address in the memory cell array 41, i.e., the position and the range in which the target data is stored. Then, the read control unit 50 generates the data preparing command of reading out the data from the physical address range obtained by the conversion and preparing the data in the page buffer 42, and transmits the generated data preparing command to the NAND memory 40. Then, the read control unit 50 notifies the data transfer unit 80 of the access range and the tag number described in the read command. The read control unit 50 reads out the data prepared in the page buffer 42 at the timing at which a notification (not shown) urging data readout is received from the data transfer unit 80 and stores the readout data into the read data buffer 72.

The write control unit 60 dequeues a write command queued in the write queue 30 and notifies the data transfer unit 80 of the access range described by the LBA and the number of sectors in the dequeued write command and the tag number of the write command. Moreover, the write control unit 60 monitors the cache area 73 and issues a flush instruction to the flush control unit 90 at a predetermined timing such as the timing at which the cache area 73 overflows.

When the flush control unit 90 receives the flush instruction, the flush control unit 90 saves write data stored in the cache area 73 in the NAND memory 40.

The data transfer unit 80 performs arbitration between transfer of read data and transfer of write data.

Specifically, when the data transfer unit 80 receives a notification of an access range from the read control unit 50 or the write control unit 60, the data transfer unit 80 generates a descriptor for transferring data of the access range and stores the generated descriptor in the descriptor storage area 71. The data transfer unit 80 specifies the descriptor prepared in the descriptor storage area 71 and transmits an instruction (transfer instruction) of performing the data transfer process based on the specified descriptor to the SATA controller 10. The data transfer unit 80 issues the transfer instruction so that the descriptor for read data transfer is performed in priority to the descriptor for write data transfer. When the SATA controller 10 completes the data transfer instructed by the transfer instruction, the SATA controller 10 transmits a transfer finished response to the data transfer unit 80. After receiving the transfer finished response, the data transfer unit 80 issues the next transfer instruction.

Figure 3:
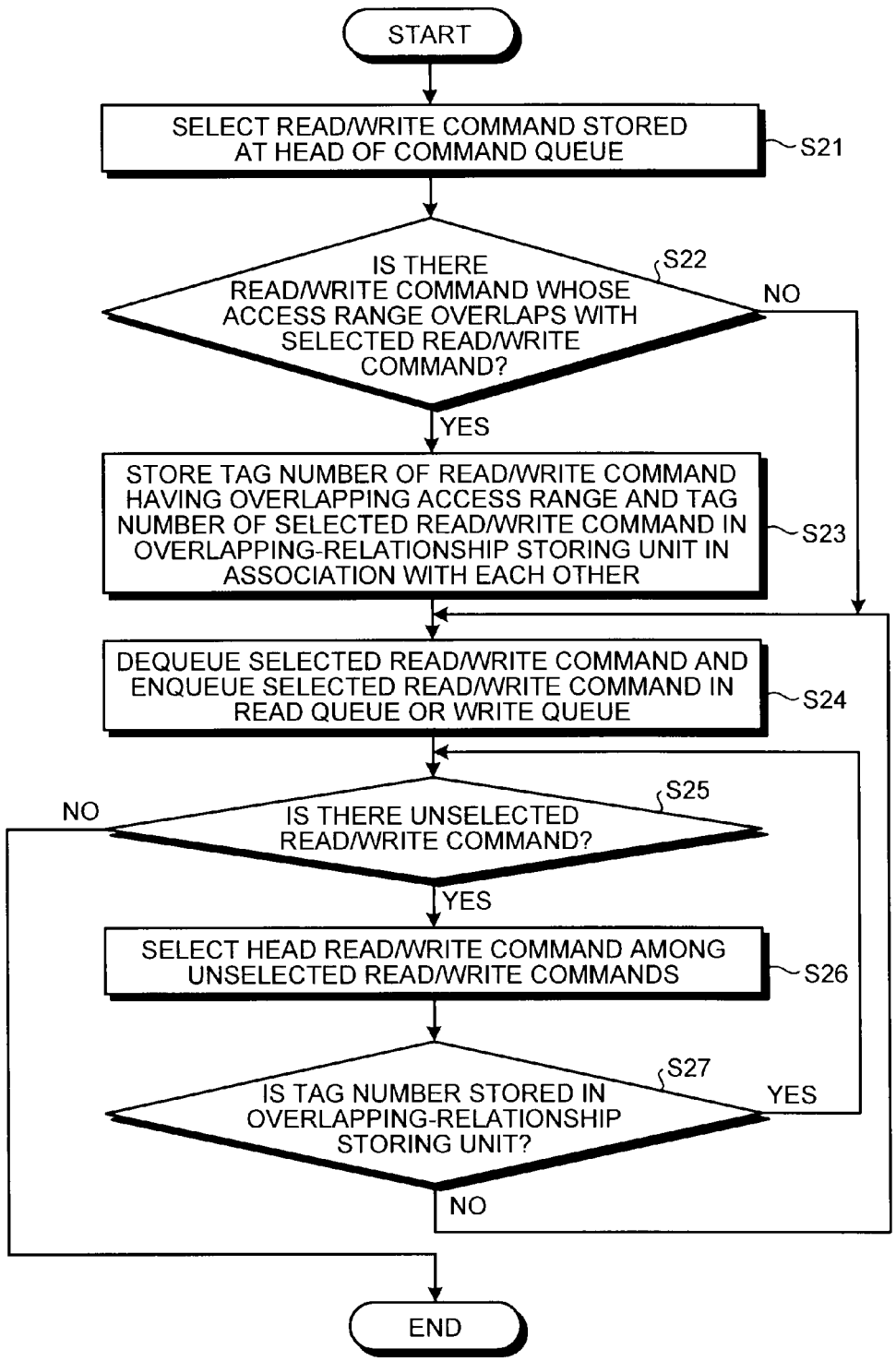
FIG. 3 is a flowchart explaining a command sorting operation in a command sorting unit.

Next, the operation of the SSD in the first embodiment of the present invention is explained with reference to FIG. 3 to FIG. 8. FIG. 3 is a flowchart explaining a command sorting operation in the command sorting unit 12.

As shown in FIG. 3, the command sorting unit 12 first selects a read/write command stored at the head of the command queue 11 (Step S21). Then, the command sorting unit 12 determines whether there is a command whose access range overlaps with the access range of the selected command among commands stored in the command queue 11 (Step S22). When there is a command having an overlapping access range (Yes at Step S22), the command sorting unit 12 stores the tag number of the command having the overlapping access range and the tag number of the selected command in the overlapping-relationship storing unit 13 in association with each other (Step S23). When there is no command having an overlapping access range (No at Step S22), the process at Step S23 is skipped.

Next, the command sorting unit 12 dequeues the selected command from the command queue 11 and enqueues the command in the read queue 20 or the write queue 30 (Step S24). When the selected command is a read command, the command sorting unit 12 enqueues the command in the read queue 20, and when the selected command is a write command, the command sorting unit 12 enqueues the command in the write queue 30.

Then, the command sorting unit 12 determines whether there is an unselected command in the command queue 11 (Step S25). When there is an unselected command in the command queue 11 (Yes at Step S25), the command sorting unit 12 selects a head command of unselected commands (Step S26) and determines whether the tag number of the selected command is stored in the overlapping-relationship storing unit 13 (Step S27). When the tag number of the selected command is not stored in the overlapping-relationship storing unit 13 (No at Step S27), the selected command is a command whose access range does not overlap with that of any earlier-received command, so that the command sorting unit 12 moves to Step S24 and dequeues the selected command and sorts the command to the read queue 20 or the write queue 30. When the tag number of the selected command is stored in the overlapping-relationship storing unit 13 (Yes at Step S27), the selected command is a command whose access range overlaps with that of an earlier-received command, so that execution of the command cannot be started until finishing execution of the earlier-received command having the overlapping access range. Therefore, the command sorting unit 12 moves to Step S25 and determines whether there is an unselected command in a state of leaving the selected command in the command queue 11.

At Step S25, when there is no unselected command (No at Step S25), the command sorting operation ends.

Figure 4:
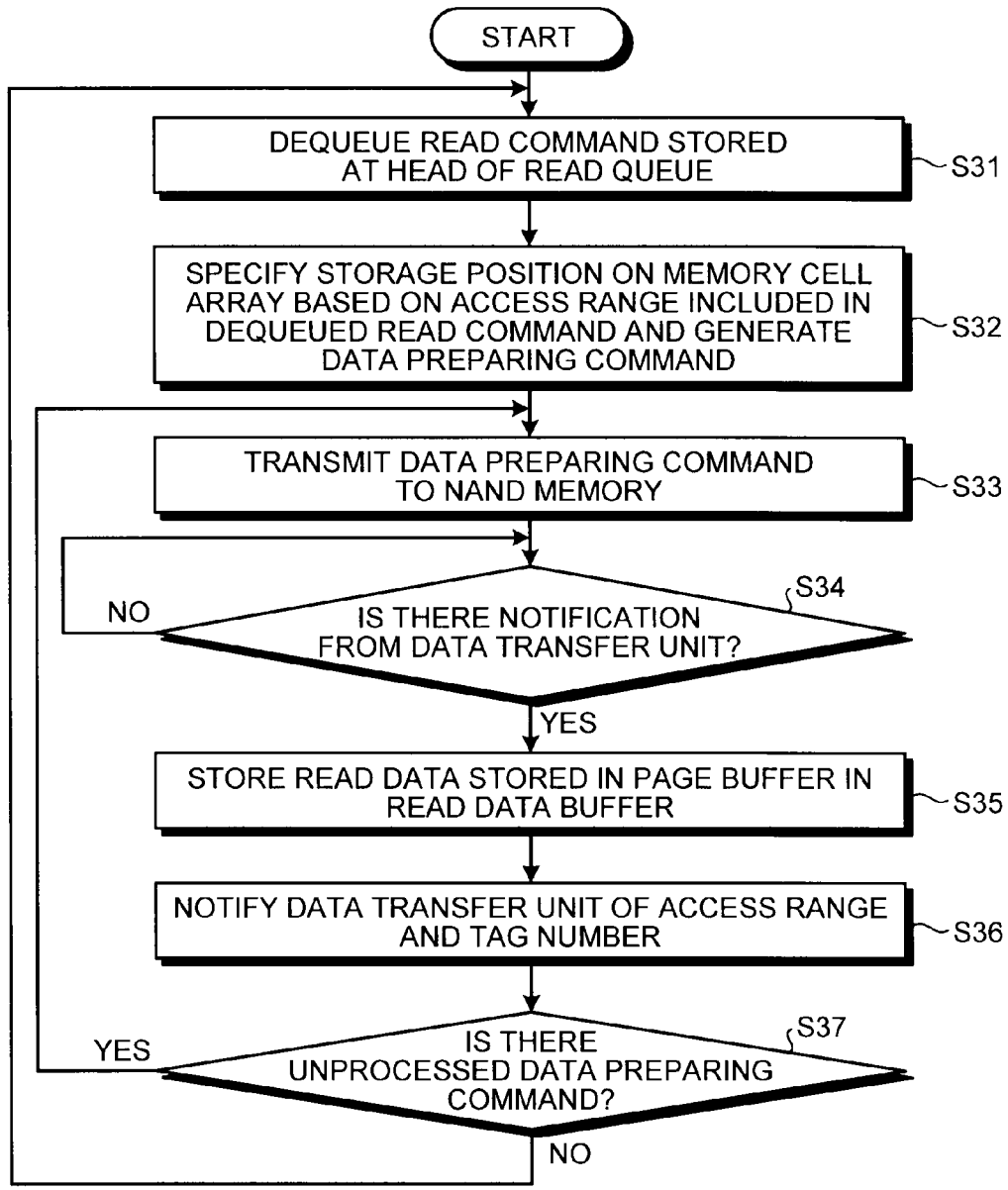
FIG. 4 is a flowchart explaining an operation of a read control unit.

FIG. 4 is a flowchart explaining the operation of the read control unit 50. As shown in FIG. 4, the read control unit 50 first dequeues a read command stored at the head of the read queue 20 (Step S31). Then, the read control unit 50 specifies the storage position on the memory cell array 41 based on the access range described in the dequeued read command and generates the data preparing command (Step S32). When the access range described in the read command has a size corresponding to a plurality of pages, a plurality of data preparing commands is generated. The read control unit 50 transmits the generated data preparing command to one NAND memory 40 (Step S33).

Then, the read control unit 50 determines whether there is a notification of urging data readout from the data transfer unit 80 (Step S34). When there is a notification (Yes at Step S34), the read control unit 50 transmits the data-out command to the NAND memory 40 to cause read data prepared in the page buffer 42 to be output and stores the output read data in the read data buffer 72 (Step S35), and notifies the data transfer unit 80 of the access range and the tag number described in the read command dequeued at Step S31 (Step S36).

Then, the read control unit 50 determines whether there is an unprocessed data preparing command (Step S37). When there is an unprocessed data preparing command (Yes at Step S37), the read control unit 50 moves to Step S33 and transmits the unprocessed data preparing command to the NAND memory 40. When there is no unprocessed data preparing command (No at Step S37), the read control unit 50 moves to Step S31 and dequeues the next read command.

Figure 5:
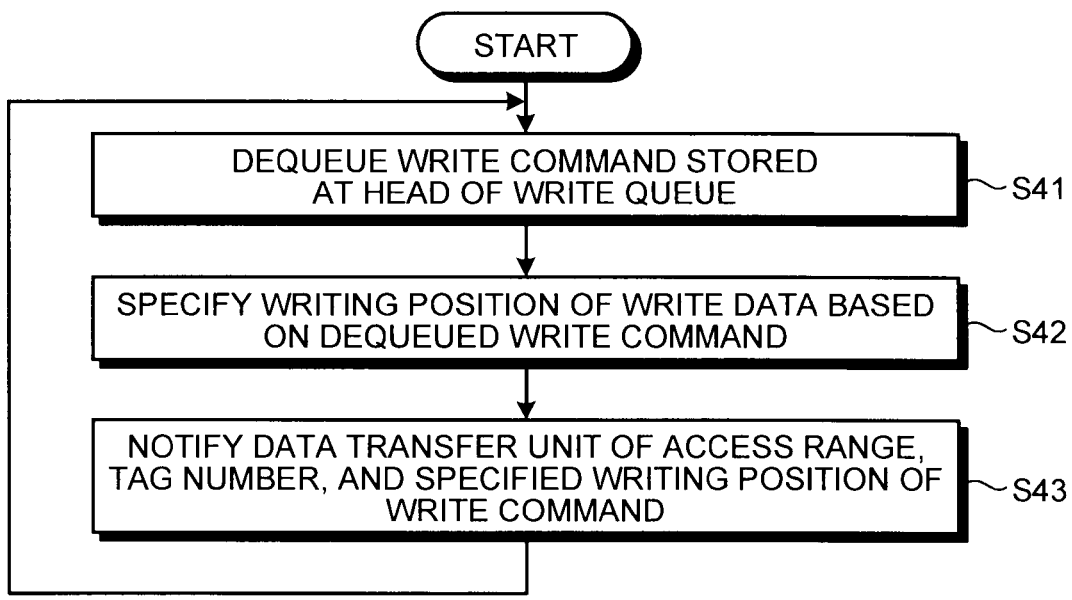
FIG. 5 is a flowchart explaining an operation of a write control unit.

FIG. 5 is a flowchart explaining the operation of the write control unit 60. As shown in FIG. 5, the write control unit 60 dequeues a write command stored at the head of the write queue 30 (Step S41). Then, the write control unit 60 specifies the writing position of write data in the cache area 73 based on the dequeued write command (Step S42). For example, when the cache area 73 is managed by an n-way set-associative method based on an LBA address, a physical address in the cache area 73 can be obtained by referring to a tag memory based on the LBA address. The write control unit 60 notifies the data transfer unit 80 of the access range, the tag number, and the specified writing position of the write command (Step S43), and moves to Step S41 and dequeues the next write command.

Figure 6:
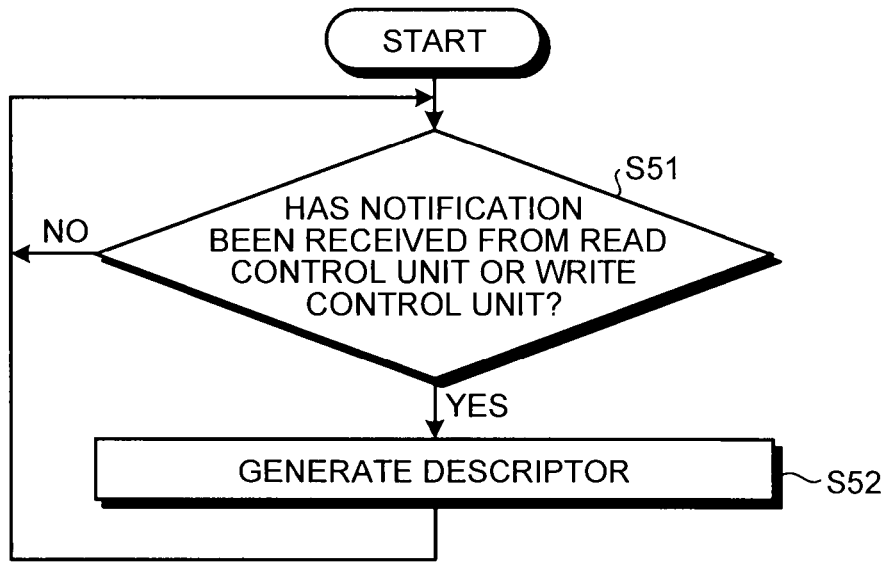
FIG. 6 is a flowchart explaining an operation of generating a descriptor by a data transfer unit.

FIG. 6 is a flowchart explaining the operation of generating a descriptor by the data transfer unit 80. As shown in FIG. 6, the data transfer unit 80 monitors whether there is a notification from the read control unit 50 or the write control unit 60 (Step S51), and when the data transfer unit 80 receives a notification (Yes at Step S51), the data transfer unit 80 generates a descriptor based on the notification (Step S52). The generated descriptor is stored in the descriptor storage area 71. After generating the descriptor, the data transfer unit 80 moves to Step S51 and continues to monitor a notification.

Figure 7:
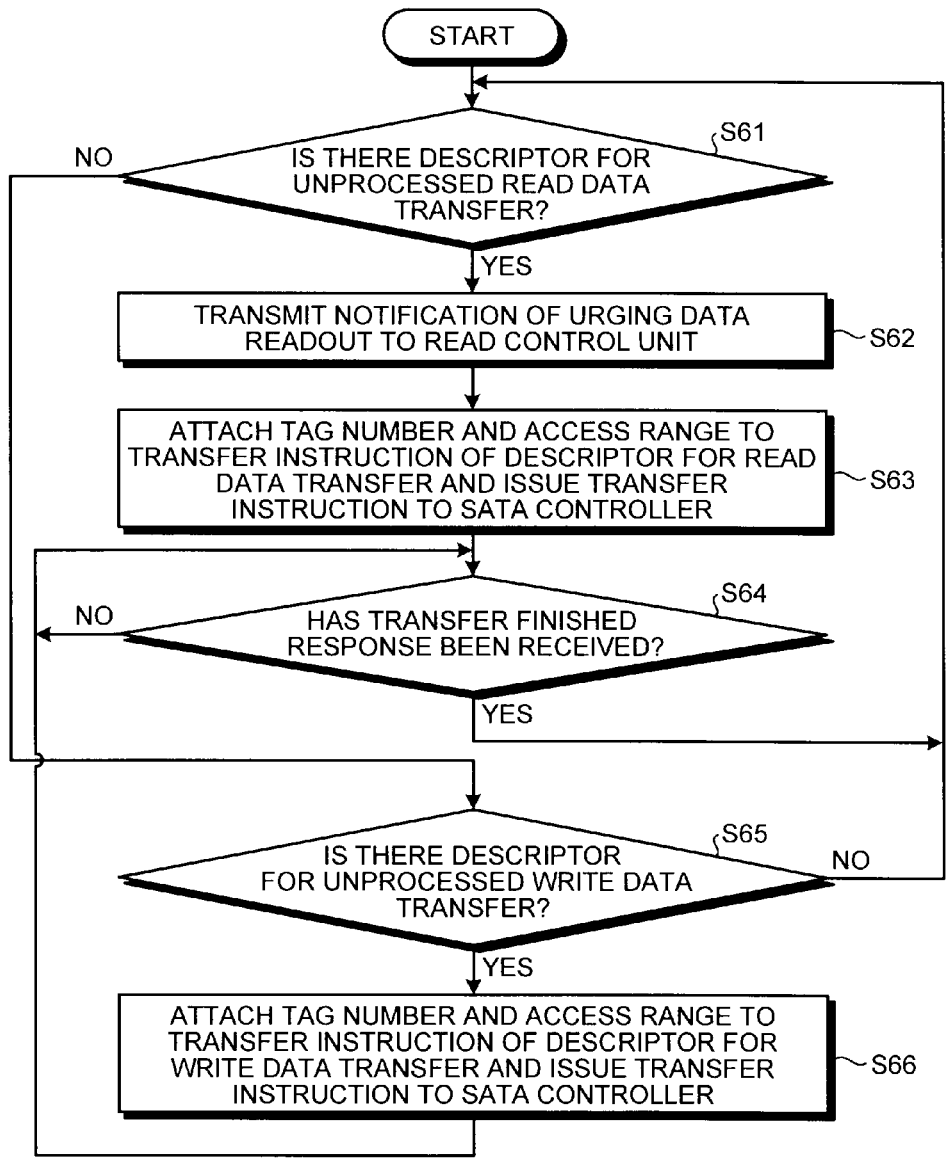
FIG. 7 is a flowchart explaining an operation of performing arbitration of data transfer by the data transfer unit.

FIG. 7 is a flowchart explaining the operation of performing arbitration of data transfer by the data transfer unit 80. As shown in FIG. 7, the data transfer unit 80 determines whether there is a descriptor for unprocessed read data transfer (Step S61). A descriptor for unprocessed read data transfer is a descriptor for data transfer that is not performed by the SATA controller 10 among already-generated descriptors. When there is a descriptor for unprocessed read data transfer (Yes at Step S61), the data transfer unit 80 issues a notification of urging data readout to the read control unit 50 (Step S62). Then, when the data read out from the page buffer 42 is stored in the read data buffer 72, the data transfer unit 80 attaches the tag number and the access range to the transfer instruction specifying the descriptor for read data transfer and issues the transfer instruction to the SATA controller 10 (Step S63). When the read data as a transfer target has a size for a plurality of pages, Step S62 and Step S63 are repeated a plurality of times.

Then, the data transfer unit 80 determines whether or not the transfer finished response has been received from the SATA controller 10 (Step S64). When the data transfer unit 80 has not received the transfer finished response (No at Step S64), the data transfer unit 80 repeats the process at Step S64 until receiving the transfer finished response. When the data transfer unit 80 has received the transfer finished response (Yes at Step S64), the data transfer unit 80 moves to Step S61.

At Step S61, when there is no description for unprocessed read data transfer (No at Step S61), the data transfer unit 80 determines whether there is a descriptor for unprocessed write data transfer (Step S65). When there is a descriptor for unprocessed write data transfer (Yes at Step S65), the data transfer unit 80 attaches the tag number and the access range to the transfer instruction related to the descriptor for write data transfer and issues the transfer instruction to the SATA controller 10 (Step S66), and then moves to Step S64. When there is no descriptor for unprocessed write data transfer (No at Step S65), the data transfer unit 80 moves to Step S61.

Figure 8:
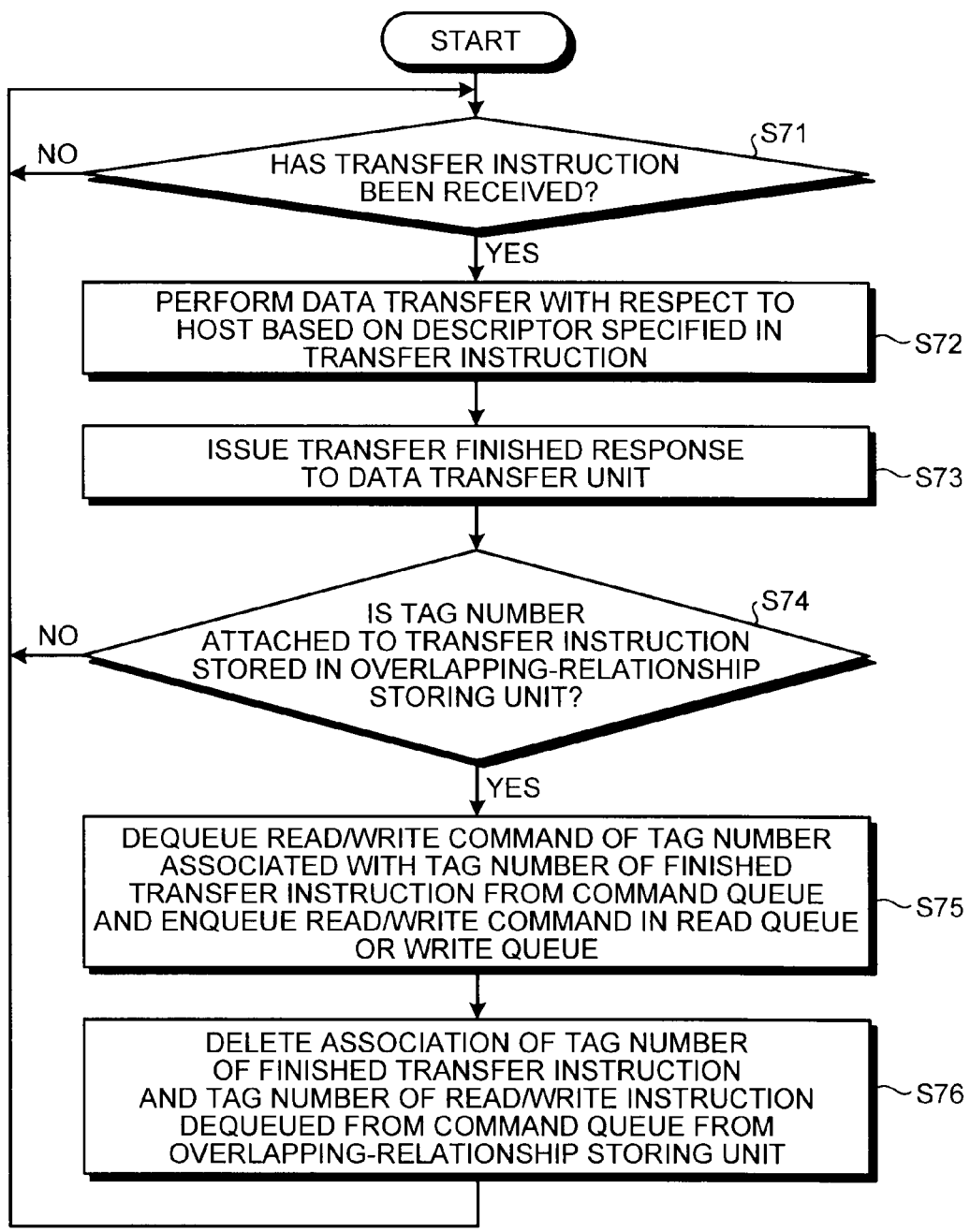
FIG. 8 is a flowchart explaining an operation of performing data transfer by a SATA controller to a host.

FIG. 8 is a flowchart explaining the operation of performing data transfer by the SATA controller 10 to the host 2. As shown in FIG. 8, the SATA controller 10 determines whether or not the transfer instruction has been received from the data transfer unit 80 (Step S71). When the SATA controller 10 has not received the transfer instruction from the data transfer unit 80 (No at Step S71), the SATA controller 10 performs the process at Step S71 until receiving the transfer instruction. When the SATA controller 10 has received the transfer instruction (Yes at Step S71), the SATA controller 10 performs data transfer with respect to the host 2 based on the descriptor specified in the transfer instruction (Step S72). Specifically, when performing transfer of write data, the SATA controller 10 stores data transferred from the host 2 in an address in the cache area 73 specified by the descriptor. When performing transfer of read data, the SATA controller 10 reads out read data stored in an address in the read data buffer 72 specified by the descriptor and transfers the read data to the host 2.

After the data transfer is finished, the SATA controller 10 issues the transfer finished response to the data transfer unit 80 (Step S73). Then, the SATA controller 10 determines whether the tag number attached to the finished transfer instruction is stored in the overlapping-relationship storing unit 13 (Step S74). When the tag number attached to the finished transfer instruction is stored in the overlapping-relationship storing unit 13 (Yes at Step S74), it is determined that a command whose access range overlaps with that of the read/write command related to the finished transfer instruction is left in the command queue 11. Therefore, when the tag number attached to the finished transfer instruction is stored in the overlapping-relationship storing unit 13 (Yes at Step S74), the command sorting unit 12 dequeues a command of the tag number associated with the tag number of the finished transfer instruction from the command queue 11 and enqueues the command in the read queue 20 or the write queue 30 (Step S75). Then, the command sorting unit 12 deletes the association of the tag number of the finished transfer instruction and the tag number of the command dequeued from the command queue 11 from the overlapping-relationship storing unit 13 (Step S76). Then, the SATA controller 10 moves to Step S71 and waits for reception of the transfer instruction.

When the tag number attached to the finished transfer instruction is not stored in the overlapping-relationship storing unit 13 at Step S74 (No at Step S74), the SATA controller 10 moves to Step S71 and waits for reception of the next transfer instruction.

Figure 9:
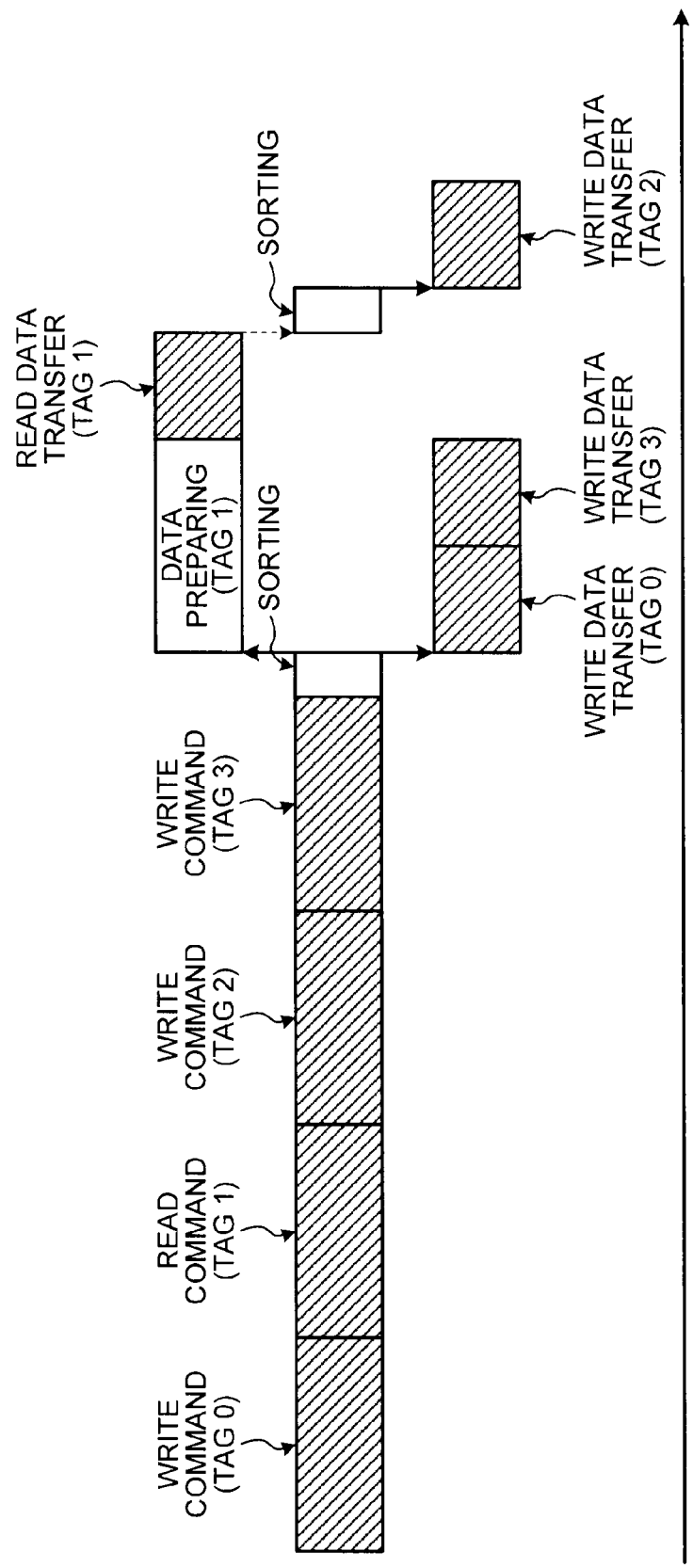
FIG. 9 is a timing chart explaining an example of data transfer between the SSD and the host in the first embodiment of the present invention.
Figure 10:
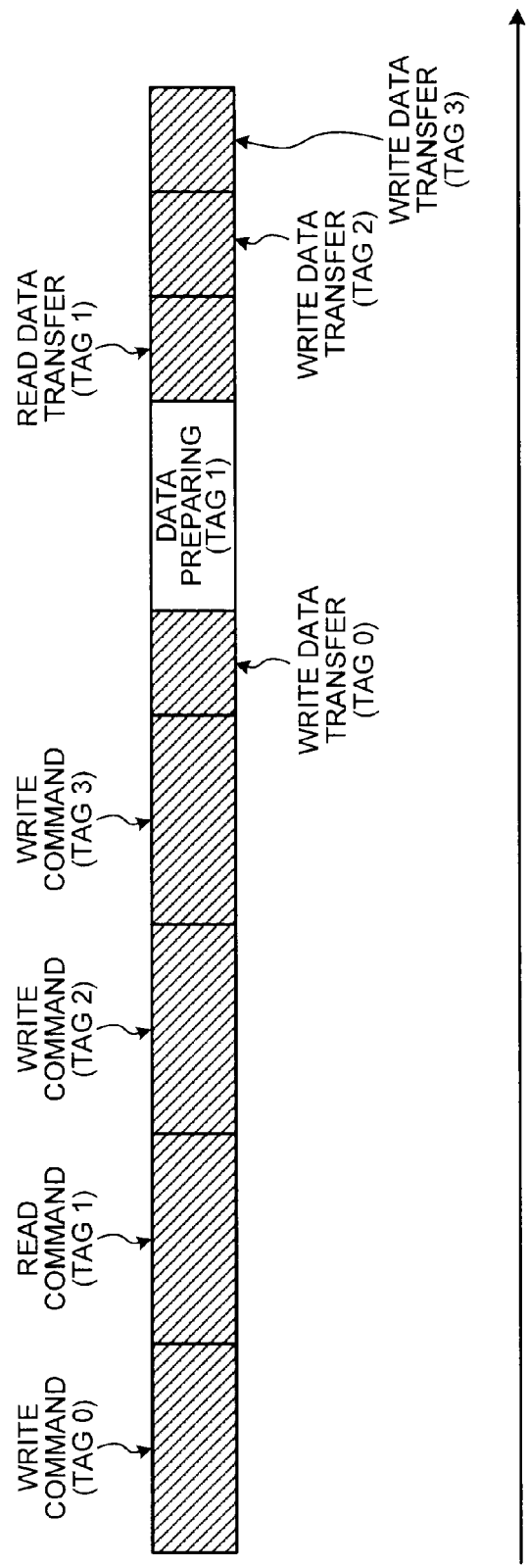
FIG. 10 is a timing chart explaining an example of data transfer between an SSD and the host in a comparison example.

FIG. 9 is a timing chart explaining an example of data transfer between the SSD 1 and the host 2 in the first embodiment of the present invention that operates as above, and FIG. 10 is a timing chart explaining an example of data transfer between an SSD and the host 2 in a comparison example. In FIG. 9 and FIG. 10, the host 2 issues a write command to which the tag number "0" is attached, a read command to which the tag number "1" is attached, a write command to which the tag number "2" is attached, and a write command to which the tag number "3" is attached in this order, and the access ranges of the read command to which the tag number "1" is attached and the write command to which the tag number "2" is attached overlap with each other. Portions indicating processes of performing data (or command) transfer on the SATA interface are hatched. In the following, a read (write) command of the tag number "n" is expressed as a read (write) command n for short.

In FIG. 9, when the host 2 serially transmits respective commands on the SATA interface, the command sorting operation is performed. By the command sorting operation, the read command 1 is queued in the read queue 20 and the write command 0 and the write command 3 are queued in the write queue 30 in this order. The access range of the write command 2 overlaps with that of the read command 1, so that the write command 2 is not queued in the write queue 30 at this point. After the command sorting, the data preparing process related to the read command 1 is started, however, the SATA interface is not used in the data preparing process, so that write data transfer related to the write command 0 is started during execution of the data preparing process by arbitration by the data transfer unit 80. Then, at the time when the write data transfer related to the write command 0 is finished, the data preparing process is still continuing, so that the write data transfer related to the write command 3 is started. At the time when the write data transfer related to the write command 3 is finished, the data preparing process related to the read command 1 is finished, so that the data transfer unit 80 uses the SATA interface for the read data transfer related to the read command 1. After finishing the read data transfer related to the read command 1, the write command 2 whose access range overlaps with that of the read command 1 is queued in the write queue 30 and the SATA interface is used for the write data transfer related to the write command 2.

On the other hand, in FIG. 10, after respective commands are serially transmitted, the commands are executed in the transmitted order. Specifically, first, the write data transfer related to the write command 0 is performed. After this write data transfer, the data preparing process related to the read command 1 is started. During execution of the data preparing process, data transfer is not performed on the SATA interface. When the data preparing process is finished, the read data transfer related to the read command 1 is performed. After the read data transfer related to the read command 1 is finished, the write data transfer related to the write command 2 and the write data transfer related to the write command 3 are sequentially performed.

In this manner, in the SSD in the comparison example, even if commands are transmitted using the NCQ function, data transfer is not performed at the time of execution of the data preparing process, however, in the SSD 1 in the first embodiment of the present invention, transfer of write data can be performed at the time of execution of the data preparing process, so that a command group transmitted using the NCQ function can be processed faster than the SSD in the comparison example. In other words, the use efficiency of the SATA interface can be improved.

As explained above, according to the first embodiment of the present invention, the memory system includes the read queue 20 that accumulates therein a read command, the write queue 30 that accumulates therein a write command, the command sorting unit 12 that dequeues commands excluding a later-arrived command whose access range overlaps with an access range of an earlier-arrived command from the command queue 11, and enqueues the dequeued command in the read queue 20 or the write queue 30, and the data transfer unit (the SATA controller 10, the read control unit 50, the write control unit 60, and the data transfer unit 80) that sequentially performs the data preparing process of causing read data related to a read command to be read out from the memory cell array 41 to the read buffer 42 and the read data transfer (first data transfer) of transferring the read data read out to the read buffer 42 to the host 2 for each read command, and sequentially performs the write data transfer (second data transfer) of receiving write data related to a write command that is transmitted from the host 2 and storing the received write data in the cache area 73 for each write command accumulated in the write queue 30, in which the data transfer unit performs the data preparing process and the write data transfer in parallel. Therefore, it is possible to hide the waiting time required for the data preparing process from the host 2 while considering a command group in which the execution order of commands needs to be followed due to overlapping access ranges. Therefore, the transfer efficiency with respect to the host 2 can be improved.

Moreover, the data transfer unit, when capable of performing both the read data transfer and the write data transfer, first performs the read data transfer. Therefore, the write data transfer and the data preparing process can be performed as simultaneously as possible, and as a result, the transfer process with respect to the host 2 can be improved. For example, when the first data preparing process, the first read data transfer, the second data preparing process, and the second read data transfer need to be performed and there is a write command in the write queue 30 at the time when the first data preparing process is finished, the first read data transfer is performed first. Consequently, transfer of write data related to the write command in the write queue 30 is performed at the same time with the second data preparing process. If the write data transfer related to the write command in the write queue 30 is performed before the first read data transfer, the first read data transfer is kept waiting until the write data transfer is finished. Moreover, when there is no other write command in the write queue 30, the SATA interface is in a state in which data transfer is not performed at the time of execution of the second data preparing process. In other words, the transfer efficiency with respect to the host 2 degrades compared with the first embodiment of the present invention.

Furthermore, the command sorting unit 12, after completing data transfer related to an earlier-arrived command, dequeues a later-arrived command whose access range overlaps with that of the earlier-arrived command from the command queue 11, and enqueues the dequeued command in the read queue 20 or the write queue 30. Therefore, a plurality of commands that need to be executed following the execution order in a command group transmitted using the NCQ function can be executed in order of arrival.

Figure 11:
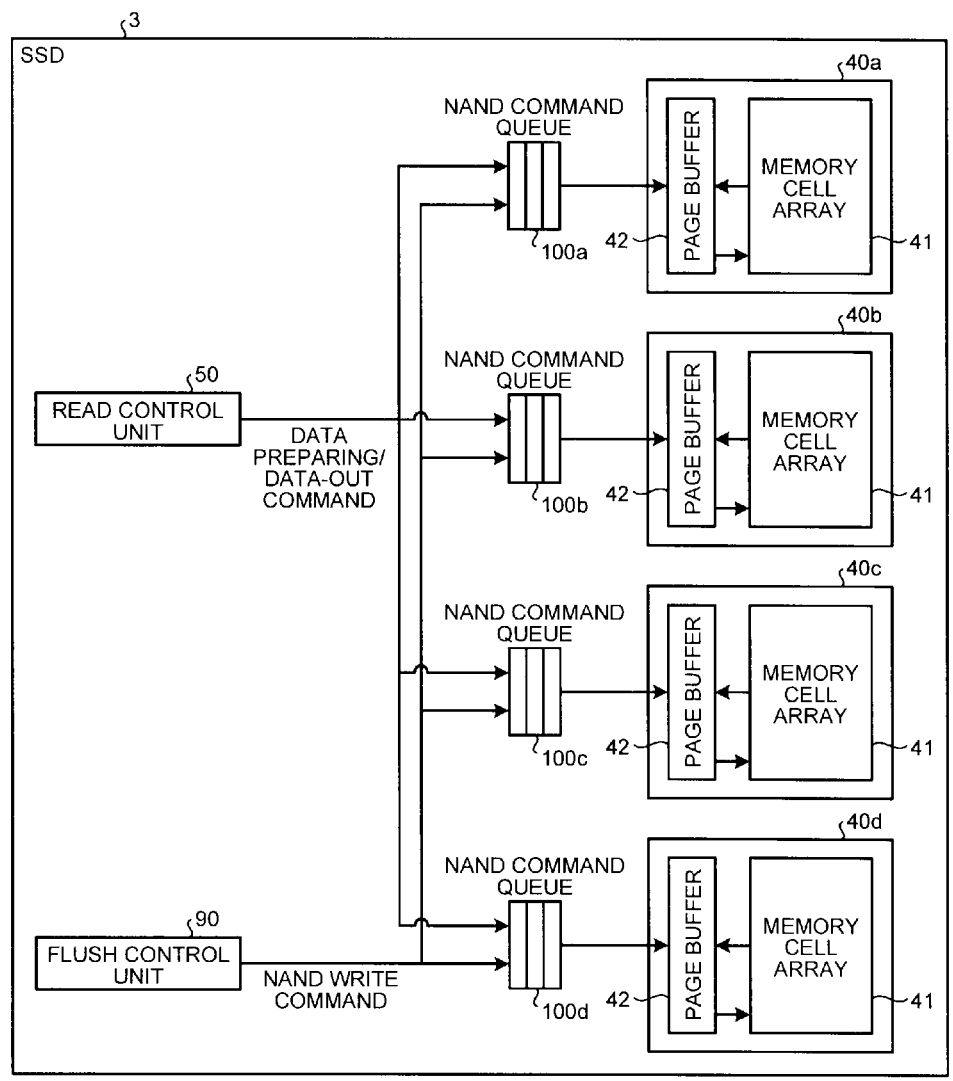
FIG. 11 is a configuration diagram of an SSD to which a memory system in a second embodiment of the present invention is applied.

FIG. 11 is a configuration diagram of an SSD to which a memory system in a second embodiment of the present invention is applied. An SSD 3 in the second embodiment includes a plurality of NAND memories, so that the NAND memory and the configuration near the NAND memory are different from the first embodiment. In FIG. 11, components same as those in the SSD 1 in the first embodiment are omitted.

As shown in FIG. 11, the SSD 3 includes a plurality of (four in the present embodiment) NAND memories 40a to 40d. The configuration in the NAND memories 40a to 40d is the same as that in the first embodiment. NAND command queues 100a to 100d are interposed between the NAND memories 40a to 40d and the read control unit 50, respectively. The data preparing command and the data-out command from the read control unit 50 are queued in one of the NAND command queues 100a to 100d corresponding to the NAND memory, to which the commands are to be issued, among the NAND memories 40a to 40d. The commands queued into each of the NAND command queues 100a to 100d are serially queued when the corresponding NAND memory is not operated.

Moreover, in the NAND command queues 100a to 100d, a NAND write command for saving write data cached in the cache area 73 into the NAND memories 40a to 40d by the flush control unit 90 is also enqueued. Each NAND write command, for example, includes a physical address of a write destination in the memory cell array 41 and write data.

FIG. 12 is a timing chart explaining an example of data transfer between the SSD 3 and the host 2 in the second embodiment in the present invention. In FIG. 12, the host 2 issues a read command 0, a read command 1, a write command 2, and a write command 3 in this order, and the access ranges of the commands do not overlap with each other for simplicity. Moreover, data as a read target of the read command 0 and data as a read target of the read command 1 are separately stored in corresponding NAND memories.

As shown in FIG. 12, when the host 2 serially transmits the commands on the SATA interface, the command sorting operation is performed. By this command sorting operation, the read command 0 and the read command 1 are queued in the read queue 20 in this order and the write command 2 and the write command 3 are queued in the write queue 30 in this order. As described above, data related to the read command 0 and data related to the read command 1 are stored in different NAND memories, so that, after the command sorting, the data preparing process related to the read command 0 and the data preparing process related to the read command 1 are performed simultaneously. During execution of the data preparing processes, the write data transfer related to the write command 2 and the write data transfer related to the write command 3 are continuously performed by arbitration of the data transfer unit 80. After finishing the data preparing processes, the prepared read data related to the read command 0 and the prepared read data related to the read command 1 are serially transferred. Then, during transfer of the read data, the flush control unit 90 issues a NAND flush command, so that a cache flush process is performed to flush the write data from the cache area 73 to the NAND memory that is not performing read data transfer among the NAND memories 40a to 40d.

In this manner, according to the second embodiment of the present invention, a plurality of the NAND memories 40 is included, and the data transfer unit performs the data preparing processes related to a plurality of read commands, in which the readout sources are different NAND memories 40, in parallel. Therefore, the data preparing process that is a heavy process compared with the transfer rate of the SATA interface can be performed in parallel in a plurality of the NAND memories 40. Consequently, the transfer efficiency with respect to the host 2 can be improved.

Moreover, the data transfer unit performs the data flushing (third data transfer) of writing write data cached in the cache area 73 into the memory cell array 41 at a predetermined timing and performs the read data transfer and the data flushing in parallel. Therefore, it is possible to hide the processing time required for the cache flushing of the write data from the host 2. Consequently, the transfer efficiency with respect to the host 2 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
    a first memory device that includes a nonvolatile memory cell array and a read buffer inside the first memory device, the read buffer storing data read out from the memory cell array before outputting the data from the first memory device;
    a second memory device that includes a cache area, a descriptor storage area, and a read data buffer;
    a command queue configured to store at least one write command and at least one read command received from the host apparatus in order of arrival;
    a read queue configured to store the at least one read command received from the command queue;
    a write queue configured to store the at least one write command received from the command queue;
    a command sorting unit configured to dequeue commands excluding a later-arrived command whose access range overlaps with an access range of an earlier-arrived command from the command queue;
    a data transfer unit configured to
        perform a data preparing process of transferring first data to the read buffer from the memory cell array in the first memory device, the first data being specified by the read command stored in the read queue,
        perform a first data transfer of outputting the first data stored in the read buffer to the host apparatus, and
        perform a second data transfer of storing second data in the cache area, the second data being specified by the write command stored in the write queue, and
        perform the data preparing process and the second data transfer in parallel; and
    a flush control unit configured to save the second data, which is stored in the cache area, in the memory cell array in the first memory.

2. The memory system according to claim 1, wherein the data transfer unit is connected to the host apparatus with one serial communication channel, and performs transfer of data related to the first data transfer and transfer of data related to the second data transfer via the serial communication channel.

3. The memory system according to claim 1, wherein the data transfer unit, when configured to perform both the first data transfer and the second data transfer, first performs the first data transfer.

4. The memory system according to claim 2, wherein the data transfer unit, when configured to perform both the first data transfer and the second data transfer, first performs the first data transfer.

5. The memory system according to claim 1, wherein the command sorting unit, after completing the first data transfer or the second data transfer related to the earlier-arrived command, dequeues the later-arrived command whose access range overlaps with the access range of the earlier-arrived command from the command queue.

6. The memory system according to claim 2, wherein the command sorting unit, after completing the first data transfer or the second data transfer related to the earlier-arrived command, dequeues the later-arrived command whose access range overlaps with the access range of the earlier-arrived command from the command queue.

7. The memory system according to claim 3, wherein the command sorting unit, after completing the first data transfer or the second data transfer related to the earlier-arrived command, dequeues the later-arrived command whose access range overlaps with the access range of the earlier-arrived command from the command queue.

8. The memory system according to claim 4, wherein the command sorting unit, after completing the first data transfer or the second data transfer related to the earlier-arrived command, dequeues the later-arrived command whose access range overlaps with the access range of the earlier-arrived command from the command queue.

9. The memory system according to claim 1, further comprising:
a third memory device that includes a nonvolatile memory cell array and a read buffer inside thereof, the read buffer storing data read out from the memory cell array before outputting the data from the third memory device, wherein
if readout sources are distributed to the first and third memory devices, the data transfer unit performs data preparing processes related to a plurality of read commands in parallel in the first and third memory devices.

10. The memory system according to claim 2, further comprising:
a third memory device that includes a nonvolatile memory cell array and a read buffer inside thereof, the read buffer storing data read out from the memory cell array before outputting the data from the third memory device, wherein
if readout sources are distributed to the first and third memory devices, the data transfer unit performs data preparing processes related to a plurality of read commands in parallel in the first and third memory devices.

11. The memory system according to claim 3, further comprising:
a third memory device that includes a nonvolatile memory cell array and a read buffer inside thereof, the read buffer storing data read out from the memory cell array before outputting the data from the third memory device, wherein
if readout sources are distributed to the first and third memory devices, the data transfer unit performs data preparing processes related to a plurality of read commands in parallel in the first and third memory devices.

12. The memory system according to claim 5, further comprising:
a third memory device that includes a nonvolatile memory cell array and a read buffer inside thereof, the read buffer storing data read out from the memory cell array before outputting the data from the third memory device, wherein
if readout sources are distributed to the first and third memory devices, the data transfer unit performs data preparing processes related to a plurality of read commands in parallel in the first and third memory devices.

13. The memory system according to claim 9, wherein the data transfer unit
performs a third data transfer of flushing data stored in the second memory to the first or third memory device at a predetermined timing, and
during execution of the first data transfer in the first memory device, performs the third data transfer in the third memory device in parallel.

14. The memory system according to claim 10, wherein the data transfer unit
performs a third data transfer of flushing data stored in the second memory to the first or third memory device at a predetermined timing, and
during execution of the first data transfer in the first memory device, performs the third data transfer in the third memory device in parallel.

15. A data transfer method comprising:
storing data read out from a memory cell array of a first memory device in a read buffer before outputting the data from the first memory, the read buffer being inside the first memory device;
enqueuing commands including at least one read command and at least one write command received from the host apparatus in a command queue in order of arrival;
dequeuing commands excluding a later-arrived command whose access range overlaps with an access range of an earlier-arrived command from the command queue, and enqueuing the at least one read command in a read queue and enqueuing the at least one write command in a write queue;
performing a data preparing process of transferring first data to the read buffer from the memory cell array in the first memory device, the first data being specified by the read command stored in the read queue;
performing a first data transfer of outputting the first data stored in the read buffer to the host apparatus;
performing a second data transfer of storing second data in a cache area of a second memory device, the second memory device also including a descriptor storage area and a read data buffer, the second data being specified by the write command stored in the write queue and is transmitted from the host apparatus;
performing the data preparing process and the second data transfer in parallel; and
saving the second data, which is stored in the cache area, in the memory cell array.

16. The data transfer method according to claim 15, wherein a memory system is connected to the host apparatus with one serial communication channel, and performs transfer of read data related to the first data transfer and transfer of write data related to the second data transfer via the serial communication channel.

17. The data transfer method according to claim 15, wherein when it is capable of performing both the first data transfer and the second data transfer, the first data transfer is performed first.

18. The data transfer method according to claim 15, wherein the enqueuing the read command in the read queue and enqueuing the write command in the write queue includes, after completing the first data transfer or the second data transfer related to the earlier-arrived command, dequeuing the later-arrived command whose access range overlaps with the access range of the earlier-arrived command from the command queue.

19. The data transfer method according to claim 15, further comprising:
storing data read out from a memory cell array of a third memory device in a read buffer before outputting the data from the third memory, the read buffer being inside the third memory device;
if readout sources are distributed to the first and third memory devices, performing data preparing processes related to a plurality of read commands in parallel in the first and third memory devices.

20. The data transfer method according to claim 19, further comprising:
performing a third data transfer of flushing data stored in the second memory to the first or third memory device at a predetermined timing; and
performing, during execution of the first data transfer in the first memory device, the third data transfer in the third memory device in parallel.

* * * * *